US007751363B1

(12) United States Patent
Etemad et al.

(10) Patent No.: US 7,751,363 B1
(45) Date of Patent: Jul. 6, 2010

(54) SYSTEM AND METHOD FOR ALLOCATING TRAFFIC AND ASSOCIATED CONTROL CHANNELS

(75) Inventors: Kamran Etemad, Potomac, MD (US); Masoud Olfat, Clarksville, MD (US)

(73) Assignee: Nextel Communications Inc., Overland Park, KS (US)

( * ) Notice: Subject to any disclaimer, the term of this patent is extended or adjusted under 35 U.S.C. 154(b) by 784 days.

(21) Appl. No.: 11/283,858

(22) Filed: Nov. 22, 2005

Related U.S. Application Data

(60) Provisional application No. 60/629,405, filed on Nov. 22, 2004.

(51) Int. Cl.
*H04W 4/00* (2009.01)
*H04W 72/00* (2009.01)

(52) U.S. Cl. ...................... 370/329; 370/330; 370/341; 455/450; 455/452.1

(58) Field of Classification Search ................ 455/450, 455/452.1; 370/330, 329, 341
See application file for complete search history.

(56) References Cited

U.S. PATENT DOCUMENTS

| | | | | |
|---|---|---|---|---|
| 5,732,073 | A * | 3/1998 | Kusaki et al. | 370/280 |
| 5,812,952 | A * | 9/1998 | On et al. | 455/452.1 |
| 6,724,742 | B1 * | 4/2004 | Mun et al. | 370/335 |
| 7,092,373 | B2 * | 8/2006 | Parantainen et al. | 370/337 |
| 7,277,492 | B2 * | 10/2007 | Itoh | 375/259 |
| 7,298,762 | B2 * | 11/2007 | Rakib | 370/468 |
| 7,620,014 | B1 * | 11/2009 | Marques-Pucheu et al. | 370/330 |
| 2002/0141355 | A1 * | 10/2002 | Struhsaker et al. | 370/280 |
| 2004/0047284 | A1 * | 3/2004 | Eidson | 370/203 |
| 2004/0184484 | A1 * | 9/2004 | Marchok et al. | 370/480 |
| 2004/0219926 | A1 * | 11/2004 | Kim et al. | 455/452.2 |
| 2005/0107036 | A1 * | 5/2005 | Song et al. | 455/23 |
| 2005/0135318 | A1 * | 6/2005 | Walton et al. | 370/338 |
| 2006/0029011 | A1 * | 2/2006 | Etemad et al. | 370/311 |
| 2006/0035639 | A1 * | 2/2006 | Etemad et al. | 455/436 |
| 2006/0089154 | A1 * | 4/2006 | Laroia et al. | 455/456.2 |
| 2008/0039107 | A1 * | 2/2008 | Ma et al. | 455/450 |
| 2008/0159231 | A1 * | 7/2008 | Kim et al. | 370/331 |
| 2008/0259903 | A1 * | 10/2008 | Lim et al. | 370/349 |

OTHER PUBLICATIONS

Marks et al., "IEEE Standard 802.16: A Technical Overview of the WirelessMAN™ Air Interface for Broadband Wireless Access," Jun. 4, 2002, IEEE 802.16 Broadband Wireless Access Working Group.*

IEEE Standards, IEEE 802.16-2004, "Air interface for Fixed Broadcast Wireless Access Systems", Oct. 1, 2004, IEEE; (available form http://wirelessman.org/pubs/80216-2004.html).*

(Continued)

*Primary Examiner*—Rafael Pérez-Gutiérrez
*Assistant Examiner*—Allahyar Kasraian

(57) ABSTRACT

Systems and methods for allocating traffic and associated control channels are provided. A downlink traffic control message can include an identification of a downlink traffic channel and an identification of an associated uplink control channel. An uplink traffic control message can include an identification of an uplink traffic channel and an identification of an associated downlink control channel in a frame subsequent to the frame of the uplink traffic channel. The associated control channels can be a feedback channel, which can provide power control information, retransmission request information, channel quality indication information and/or the like.

21 Claims, 3 Drawing Sheets

Figure 1:
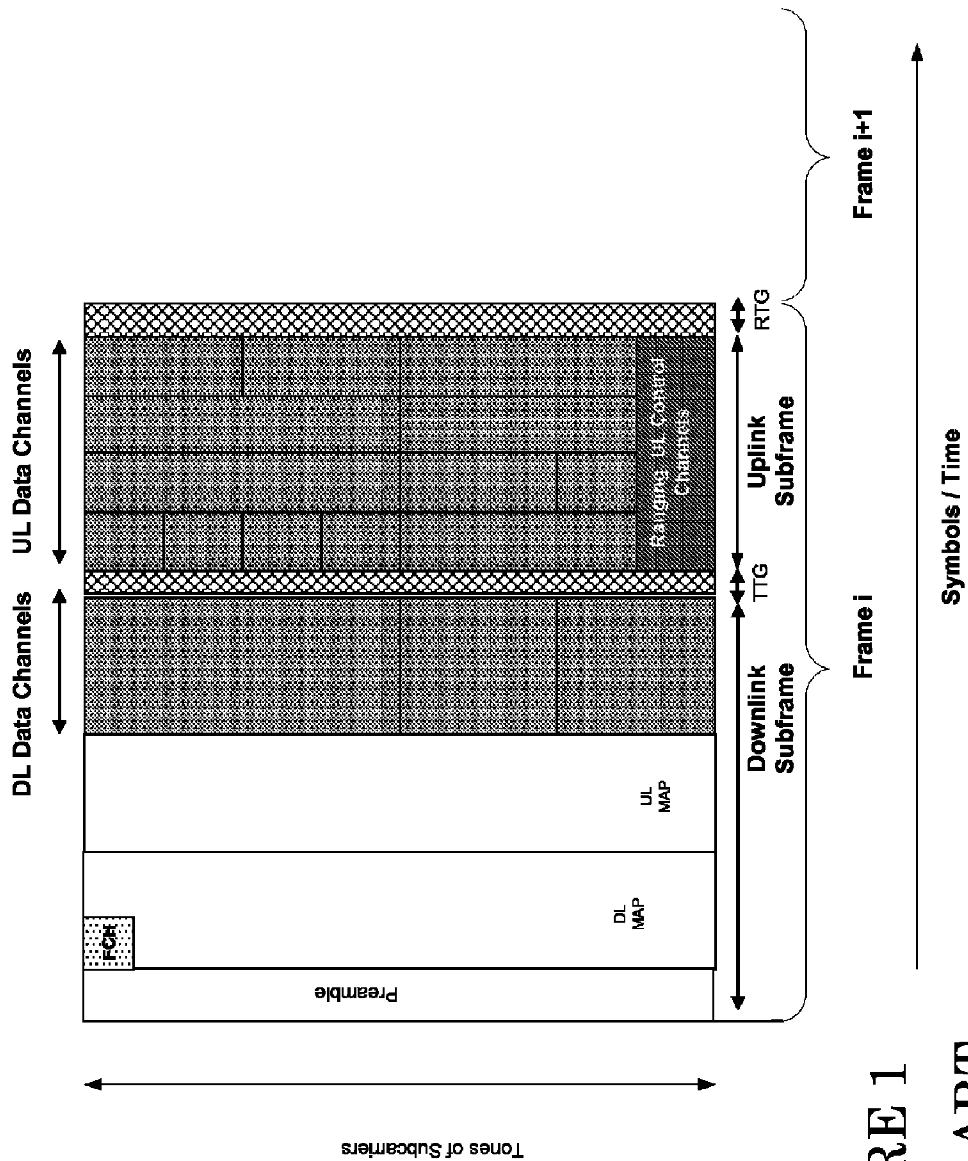

Determine Which One of a Plurality of Downlink Traffic Channels to Allocate — 205
Determine Which One of a Plurality of Associated Uplink Control Channels to Allocate — 210
Form Downlink Traffic Channel Allocation Message, Including Identification of Allocated Downlink Traffic and Uplink Control Channels — 215
Determine Which One of a Plurality of Uplink Traffic Channels to Allocate — 220
Determine Which One of a Plurality of Associated Downlink Control Channels to Allocate in the Next Downlink Subframe — 225
Form Uplink Traffic Channel Allocation Message, Including Identification of Allocated Uplink Traffic and Downlink Control Channels — 230
Transmit Downlink and Uplink Traffic Channel Allocation Messages in a Downlink Portion of a Frame — 235
Transmit Information in Downlink Traffic Channel, Receive Information in Associated Uplink Control Channel, Receive Information in Uplink Traffic Channel and Transmit Information in Associated Downlink Control Channel in Next Downlink Subframe — 240

Receive Frame — 250
Determine That a Downlink Traffic Channel Allocation Message Identifies the Subscriber Station — 255
Process Downlink Traffic Channel Allocation Message to Identify Allocated Downlink Traffic Channel and Associated Uplink Control Channel — 260
Determine That an Uplink Traffic Channel Allocation Message Identifies the Subscriber Station — 265
Process Uplink Traffic Channel Allocation Message to Obtain an Identification of an Allocated Uplink Traffic Channel and an Identification of an Associated Downlink Control Channel in the Next Downlink Subframe — 270
Receive Information in Downlink Traffic Channel, Transmit Information in Associated Uplink Control Channel, Transmit Information in Uplink Traffic Channel and Receive Information in Associated Downlink Control Channel in Next Downlink Subframe — 275

OTHER PUBLICATIONS

IEEE Std 802.16-2004, IEEE standard for local and metropolitan area networks, "Part 16: Air Interference for Fixed Broadband Wireless Access Systems", Oct. 1, 2004, pp. 151-269 and 493-631. (http://standards.ieee.org/getieee802/download/802.16-2004.pdf).*

* cited by examiner

SYSTEM AND METHOD FOR ALLOCATING TRAFFIC AND ASSOCIATED CONTROL CHANNELS

The present application claims priority under 35 U.S.C. §119 to U.S. Provisional Application No. 60/629,405, filed Nov. 22, 2004, the entire disclosure of which is herein expressly incorporated by reference.

BACKGROUND OF THE INVENTION

In wireless communication systems, a base station transmits information to a subscriber station in a "downlink" and receives information from the subscriber station in an "uplink." As used herein, the term subscriber station includes both fixed and mobile stations, including, but not limited to, wireless data devices, wireless voice devices and/or the like. There are a variety of different modulation and transmission schemes for wireless communications. One type of wireless communications is defined in the IEEE 802.16e standard, which uses an orthogonal frequency division multiple access (OFDMA) frame with Time Division Duplexing (TDD) as a modulation and transmission scheme.

FIG. 1 illustrates an exemplary OFDMA frame with TDD used in the IEEE 802.16e standard. The horizontal axis represents time, while the vertical axis represents frequency tones or subcarriers. An OFDMA frame in a TDD system is divided into downlink and uplink subframes. Between the downlink and uplink subframes of a particular frame is a transmit transmission gap (TTG), which provides time for a base station to transition from a transmission mode to a receive mode and subscriber stations to transition from a receive mode to a transmission mode. A receive transmission gap (RTG) is provided between an uplink subframe of one frame and the downlink subframe of a subsequent frame. The RTG provides base stations time to transition from a receive mode to a transmission mode and subscriber stations to transition from a transmission mode to a receive mode.

In the frame of FIG. 1, the downlink subframe includes a preamble, frame control header (FCH), downlink MAP (DL-MAP), uplink MAP (UL-MAP) and downlink data channels. The preamble is used by subscriber stations for cell acquisition and frame synchronization. The FCH is a broadcast channel located right after preamble, and includes information indicating the size of DL-MAP, repetition coding and forward error correction (FEC) coding used in DL-MAP, and other information related to the current frame. The DL-MAP, which follows immediately after FCH, includes a number of information elements (IEs), which define the usage of the downlink data channels and includes information such as frame synchronization, paging messages, downlink channel allocations and configuration change counts.

The UL-MAP includes a number of information elements, which define the usage of the uplink data channels, and includes information such as uplink channel allocations, and uplink configuration change counts. The downlink data channels are used to transport information from a base station to subscriber stations. The uplink subframe includes the uplink data channels, as well as ranging and uplink control channels. The uplink data channels are used to transport information from subscriber stations to a base station.

SUMMARY OF THE INVENTION

The allocation of downlink channels only in the DL-MAP and uplink channels only in the UL-MAP can result in a large amount of signaling overhead and reduced medium access control (MAC) efficiency. Specifically, many times a channel in the downlink data channel is logically paired with a channel in the uplink data channel. For example, a downlink traffic channel, transmitted in the downlink data channels, is paired with an associated uplink control channel, which can provide feedback to the base station. Such feedback can include power control information, retransmission request information (e.g., an ACK or NACK message), or a channel quality indication (CQI) report. However, current systems will transmit the allocation of a downlink traffic channel in the DL-MAP and the associated uplink control channel in the UL-MAP. The use of multiple messages for allocating channels that are logically paired increases signaling overhead and reduces MAC efficiency.

One technique for channel allocation is to use a so-called "master-slave" approach. In this approach the relative locations of an uplink or downlink traffic channel relative to an associated control channel is predetermined. Although this approach reduces overhead, the use of predetermined relative locations results in an undesirably rigid frame structure and channelization.

In view of the above-identified and other deficiencies of conventional channel allocation mechanisms, the present invention allows allocation of a downlink traffic channel and an associated uplink control channel in a single downlink traffic channel allocation message. Similarly, the present invention allows allocation of an uplink traffic channel and an associated downlink control channel in a single uplink traffic channel allocation message. The relative locations of the uplink or downlink traffic channels relative to the associated control channels within a frame is not predetermined, which allows greater system flexibility.

Other objects, advantages and novel features of the present invention will become apparent from the following detailed description of the invention when considered in conjunction with the accompanying drawings.

BRIEF DESCRIPTION OF THE DRAWING FIGURES

Figures 2A, 2B:
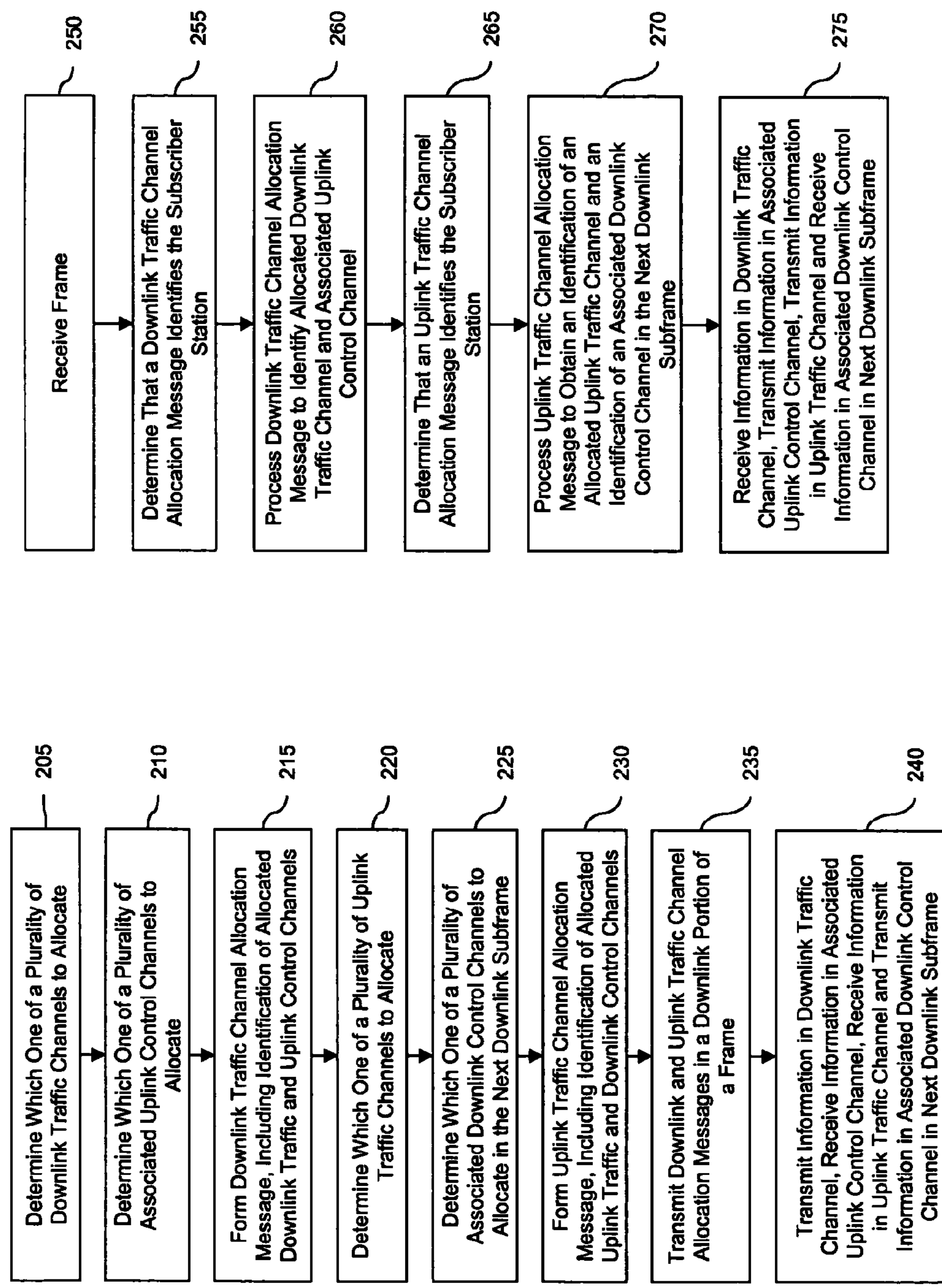
Figure 3:
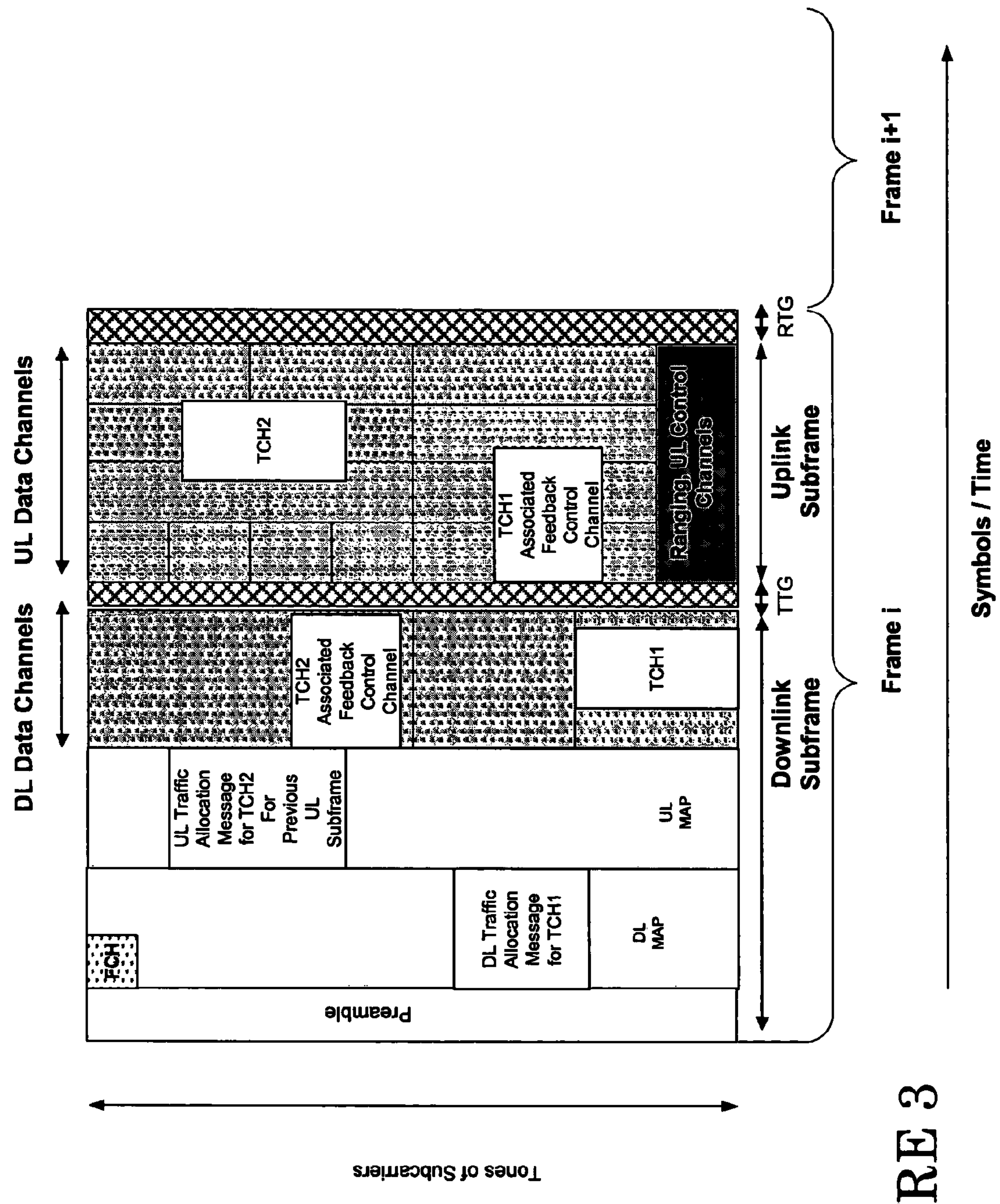

FIG. 1 illustrates an exemplary orthogonal frequency division multiple access (OFDMA) frame with Time Division Duplexing (TDD);

FIG. 2*a* illustrates an exemplary method for allocating traffic and associated control channels in accordance with the present invention;

FIG. 2*b* illustrates an exemplary method for receiving traffic and associated control channel allocations in accordance with the present invention; and FIG. 3 illustrates an exemplary OFDMA frame with traffic and associated control channel allocations in accordance with the present invention.

DETAILED DESCRIPTION OF THE PREFERRED EMBODIMENTS

FIG. 2*a* illustrates an exemplary method for allocating traffic and associated control channels in accordance with the present invention. When a base station determines that a downlink traffic channel and associated uplink control channel should be allocated to a particular subscriber station, the base station determines which one of a plurality of downlink traffic channels and which one of the plurality of associated uplink control channels to allocate to the subscriber station (steps 205 and 210). The base station then forms a downlink traffic channel allocation message, which includes an identification of the downlink traffic channel and associated uplink control channel (step 215). The downlink traffic channel and associated uplink control channel can be identified by their respective connection identifications (CIDs). The downlink traffic channel allocation message can also include an identifier of the subscriber station, such as a mobile station identification or the like.

When a base station determines that an uplink traffic channel should be allocated to a particular subscriber station, the base station determines which one of a plurality of uplink traffic channels and which one of a plurality of associated downlink control channels in the next downlink subframe to allocate to the subscriber station (steps 220 and 225). It should be recognized that the associated downlink control channel is in the next downlink subframe in order to provide feedback information because the frames in this example have the uplink data channels occurring after the downlink data channels in the frame. However, in systems where the uplink data channels occur before the downlink data channels, the associated downlink control channel will be in the same frame as the allocated uplink traffic channel.

The base station then forms an uplink traffic channel allocation message, including an identification of the allocated uplink traffic channel and associated downlink control channel (step 230). The uplink traffic channel allocation message can identify the uplink traffic channel and downlink control channel by their respective CIDs. The uplink traffic channel allocation can also include an identifier of the subscriber station, such as a mobile station identification or the like. The downlink and uplink traffic channel allocation messages are then transmitted in the appropriate portion of a frame towards a subscriber station (step 235). The base station can then transmit information to the subscriber station in the downlink traffic channel, receive information from the subscriber station in the associated uplink control channel, receive information from the subscriber station in the uplink traffic channel and transmit information to the subscriber station in the associated downlink control channel (step 240).

Although FIG. 2*a* has been described with particular acts being performed in a particular order, it should be recognized that these acts can be performed in a different order and/or some acts can be performed in parallel. For example, the acts associated with the uplink traffic channel allocation message (steps 220-230) can be performed before, or in parallel, with the acts associated with the downlink traffic channel allocation message (steps 205-215). Moreover, a base station may not perform all of these acts for any particular frame. For example, in some frames there may only be an allocation of a downlink traffic channel and an associated uplink control channel.

FIG. 3 illustrates an exemplary OFDMA frame with traffic and associated control channel allocations in accordance with the present invention. Accordingly, the downlink traffic channel allocation message in the DL-MAP identifies traffic channel TCH1 in the downlink data channel, and the associated control channel in the uplink data channels. Similarly, the uplink traffic channel allocation message in the UL-MAP identifies traffic channel TCH2 in the uplink data channel, and the associated control channel in the downlink data channels in the next downlink subframe.

FIG. 2*b* illustrates an exemplary method for receiving traffic and associated control channel allocations in accordance with the present invention. After receiving a frame (step 250) and determining that a downlink traffic channel allocation message identifies the subscriber station (step 255), the subscriber station processes the downlink traffic channel allocation message to identify a downlink traffic channel and associated uplink control channel (step 260). When the subscriber station determines that an uplink traffic channel allocation message identifies the subscriber station (step 265), the subscriber station processes the uplink traffic channel allocation message to identify an uplink traffic channel and associated downlink control channel in the next downlink subframe (step 270). The subscriber station then receives information from the base station in the downlink traffic channel, transmits information to the base station in the associated uplink control channel, transmits information to the base station in the uplink traffic channel, and receives information from the base station in the downlink associated control channel in the next downlink subframe (step 275).

Depending upon the particular requirements of a base station and/or subscriber station, a subscriber station may not perform all of the acts described above in connection with FIG. 2*b*. For example, if a subscriber station determines that there are no downlink traffic channel allocation messages that identify the particular subscriber station in a particular frame, the subscriber station will not process a downlink traffic channel allocation message, and the subscriber station may not receive information from the base station in a downlink traffic channel and/or transmit information to a base station in an associated uplink control channel. Moreover, a subscriber station may perform the acts of FIG. 2*b* in a different order, or perform some acts in parallel with others.

It will be recognized by those skilled in the art that communication systems operate according to protocols, which require both the base station and the subscriber station to operate according to the same protocols. The channel allocation of the present invention can be implemented in communication systems where some subscriber stations do not support this type of channel allocation. Specifically, for those subscriber stations that do not support the channel allocation of the present invention, channel allocation can be performed in a conventional manner. Additionally, employing the channel allocation of the present invention for subscriber stations that support such channel allocation will have no effect on those subscriber stations that do not support it. Accordingly, the method described above in connection with FIG. 2*a* can include an act of determining whether a subscriber station supports the channel allocation of the present invention before implementing the channel allocation for the particular subscriber station.

Although exemplary embodiments of the present invention have been described in connection with OFDMA TDD frames, the present invention is equally applicable to other types of modulation and transmission protocols. Additionally, the present invention is equally applicable to systems using frames in which the particular order of the uplink and downlink subframes, data channels and the like are in a different order than that described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for identifying traffic and control channels, the method comprising the acts of:

forming a downlink traffic channel allocation message, including an identification of a downlink traffic channel and an identification of an associated uplink control channel;

identifying, in the downlink traffic channel allocation message, at least one subscriber station;

forming an uplink traffic channel allocation message, including an identification of an uplink traffic channel and an identification of an associated downlink control channel; and transmitting the downlink traffic channel allocation message and the uplink traffic channel allocation message in a downlink portion of a frame, wherein the downlink traffic channel allocation message is transmitted in a downlink MAP portion of the frame and the uplink traffic channel allocation message is transmitted in an uplink MAP portion of the frame.

2. The method of claim 1, further comprising the acts of:

determining which one of a plurality of the downlink traffic channels to allocate to the at least one subscriber station; and determining which one of a plurality of associated uplink control channel to allocate to the at least one subscriber station.

3. The method of claim 1, wherein the downlink traffic channel allocation message includes a connection identification of the downlink traffic channel and associated uplink control channel.

4. The method of claim 1, further comprising the acts of:

determining which one of a plurality of uplink traffic channels to allocate to the at least one subscriber station; and determining which one of a plurality of associated downlink control channels to allocate to the at least one subscriber station, wherein the allocated associated downlink control channel is in a frame subsequent to the frame.

5. The method of claim 1, wherein the associated uplink control channel includes feedback information.

6. The method of claim 5, wherein the feedback information is power control information, retransmission request information, or channel quality information.

7. The method of claim 1, further comprising the acts of:

transmitting information in the downlink traffic channel to the at least one subscriber station; and receiving information in the associated uplink control channel from the at least one subscriber station.

8. The method of claim 1, wherein the frame is a time division duplex frame with the downlink portion being transmitted during a first period of time and an uplink portion being transmitted during a second period of time.

9. The method of claim 1, wherein an orthogonal frequency division multiplexing (OFDM) symbol modulates the downlink traffic channel allocation message prior to transmission in the downlink portion of the frame.

10. A method for identifying traffic and control channels, the method comprising the acts of:

forming an uplink traffic channel allocation message, including an identification of an uplink traffic channel and an identification of an associated downlink control channel;

identifying, in the uplink traffic channel allocation message, at least one subscriber station;

forming a downlink traffic channel allocation message, including an identification of a downlink traffic channel and an identification of an associated uplink control channel; and transmitting the uplink traffic channel allocation message and the downlink traffic channel allocation message in a downlink portion of a frame, wherein the downlink traffic channel allocation message is transmitted in a downlink MAP portion of the frame and the uplink traffic channel allocation message is transmitted in an uplink MAP portion of the frame.

11. The method of claim 10, further comprising the acts of:

determining which one of a plurality of uplink traffic channels to allocate to the at least one subscriber station; and determining which one of a plurality of associated downlink control channels to allocate to the at least one subscriber station, wherein the allocated associated downlink control channel is in a frame subsequent to the frame.

12. The method of claim 10, wherein the uplink traffic channel allocation message includes a connection identification of the uplink traffic channel and associated downlink control channel.

13. The method of claim 10, further comprising the acts of:

determining which one of a plurality of downlink traffic channels to allocate to the at least one subscriber station; and determining which one of a plurality of associated uplink control channel to allocate to the at least one subscriber station.

14. The method of claim 10, wherein the associated downlink control channel includes feedback information.

15. The method of claim 14, wherein the feedback information is power control information, retransmission request information, or channel quality information.

16. The method of claim 10, further comprising the acts of:

receiving information in the uplink traffic channel from the at least one subscriber station; and transmitting information in the associated downlink control channel to the at least one subscriber station.

17. The method of claim 10, wherein the frame is a time division duplex frame with the downlink portion being transmitted during a first period of time and an uplink portion being transmitted during a second period of time.

18. The method of claim 10, wherein an orthogonal frequency division multiplexing (OFDM) symbol modulates the downlink traffic channel allocation message prior to transmission in the downlink portion of the frame.

19. A method for a subscriber station for identifying traffic and control channels, the method comprising the acts of:

receiving a frame;

determining that a downlink traffic channel allocation message identifies the subscriber station;

processing the downlink traffic channel allocation message to obtain an identification of a downlink traffic channel and an identification of an associated uplink control channel;

determining that an uplink traffic channel allocation message identifies the subscriber station; and processing the uplink traffic channel allocation message to obtain an identification of an uplink traffic channel and an identification of an associated downlink control channel, wherein the downlink traffic channel allocation message is received in a downlink MAP portion of the frame and the uplink traffic channel allocation message is received in an uplink MAP portion of the frame.

20. The method of claim 19, further comprising the acts of:

receiving information in the downlink traffic channel; and transmitting information in the associated uplink control channel.

21. The method of claim 19, further comprising the acts of:

transmitting information in the uplink traffic channel; and receiving information in the associated downlink control channel.

* * * * *